United States Patent [19]

Manning et al.

[11] Patent Number: 5,570,257
[45] Date of Patent: Oct. 29, 1996

[54] PHASE SEQUENCE WIRING PROTECTION APPARATUS

[75] Inventors: William R. Manning, Wrentham, Mass.; Mark C. Carlos, North Providence, R.I.; Stanley J. Nacewicz, Plainville, Mass.

[73] Assignee: Texas Instruments Incorporated, Dallas, Tex.

[21] Appl. No.: 176,754

[22] Filed: Jan. 3, 1994

[51] Int. Cl.$^6$ ...................................................... H02H 3/26
[52] U.S. Cl. .............................................. 361/76; 361/85
[58] Field of Search ................................ 361/18, 20–23, 361/33, 56, 76, 77, 85, 86; 324/521, 522, 524, 86, 107, 108; 327/2, 3, 7, 28, 29, 236; 340/658

[56] References Cited

U.S. PATENT DOCUMENTS

| | | | |
|---|---|---|---|
| 4,023,075 | 5/1977 | Reuter | 361/76 |
| 4,196,378 | 4/1980 | Shirai | 361/76 |
| 4,199,798 | 4/1980 | Leppke et al. | 361/76 |
| 4,281,358 | 7/1981 | Plouffe et al. | 361/22 |

Primary Examiner—A. D. Pellinen
Assistant Examiner—Ronald W. Leja
Attorney, Agent, or Firm—Russell E. Baumann; Richard L. Donaldson; René E. Grossman

[57] ABSTRACT

A phase sequence protection circuit is shown in which first and second resistors (R1, R2) and a first capacitor (C1) all having equivalent impedance are connected in a Y configuration and coupled to power source leads (A, C, B) of a three phase power supply, resistor R1 being coupled to phase A, capacitor C1 to phase B and resistor R2 to phase C. A comparator network (12) is connected in line with the first resistor (R1) and, in one embodiment will cause a solid state switch (Q1) to conduct when the phases are out of sequence. In a second embodiment a buffer portion (COMP2) is provided to add switching hysteresis which also reverses the switching logic causing the solid state switch (Q1) to conduct when the phases are in sequence. In another embodiment the comparator network (12") is provided with the buffer portion (COMP2) for switching hysteresis and arranged to cause the solid state switch (Q1) to conduct when the phases are out of sequence. An opto-isolator (14) interfaces with the comparator network (12, 12', 12") to provide isolation. The signal from the opto-isolator in comparator network (12') controls the energization of a second solid state switch (Q2) and a relay coil (K1) used to energize a load.

6 Claims, 4 Drawing Sheets

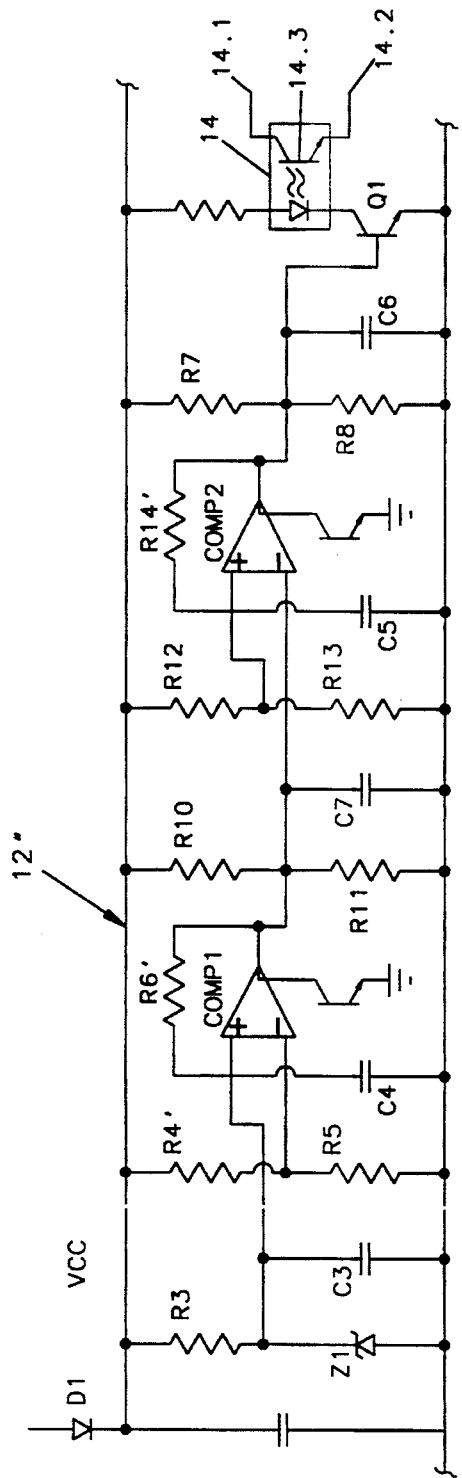
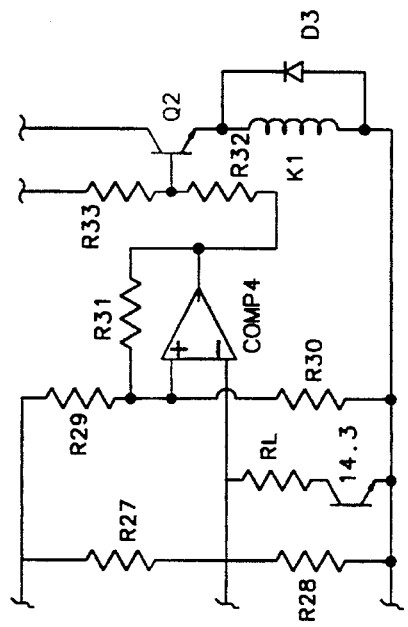
FIG. 5
FIG. 5a 5,570,257

1

PHASE SEQUENCE WIRING PROTECTION APPARATUS

BACKGROUND OF THE INVENTION

This invention relates generally to polyphase power supplies and more particularly to apparatus for preventing damage to loads caused by incorrectly wiring such loads or polyphase electrical equipment coupled to such loads to the polyphase power supply.

Certain equipment, such as scroll compressors, are designed to rotate in a given direction and will be severely damaged if caused to rotate in the reverse direction. In the case of a scroll compressor even a single partial rotation in the reverse direction will permanently damage the scroll plates. It is typical to use three phase motors to drive such compressors and, if the motor phase sequence is miswired, reverse rotation will result. That is, with respect to a three phase motor having windings A, B and C, spaced 120° apart, if these windings are coupled to phases A, C, B, respectively of a three phase power supply, the motor will run in a direction reversed to that intended.

It is therefore important that the wiring sequence be verified prior to energization of such a compressor system. A known method for detecting phase miswiring in a three phase system utilizes two neon indicator lamps and a capacitor. The resistance of the neon lamps and the reactance of the capacitor are chosen to be approximately the same and are connected in a Y configuration with the lamps coupled to what are believed to be phases A and C and the capacitor coupled to phase B. If in fact the phase sequence is as intended the second lamp coupled to phase C will glow due to the voltage drop of approximately $1.37 \times V_{Line}$. The voltage drop across the other, first, lamp will be approximately $0.37 \times V_{Line}$, below the level required for illumination. On the other hand, if in fact the phase sequence is miswired, i.e., A-C-B, the voltage drop across the first lamp will be approximately $1.37 \times V_{Line}$ and it will glow and the second lamp will be approximately $0.37 \times V_{Line}$, below that voltage level required for illumination thereby indicating a miswired condition.

Although this method can be used effectively, it does not represent a satisfactory solution to the problem. The possibility exists of someone servicing the compressor, or associated equipment, requiring the disconnection and subsequent reconnection of the leads, either not having the neon lamps and capacitor or of making an error by misinterpreting the results. Even during initial set-up of the installation the compressor system is frequently out of the direct control of the manufacturer of the system and therefore the manufacturer is not in a position to ensure that tile wiring will be done correctly. Since the cost of the compressor can be up to thousands of dollars, it would be very desirable to obviate the possibility of damage to the system occasioned by miswiring of the phase sequence.

SUMMARY OF THE INVENTION

It is therefore an object of the invention to overcome the above noted prior art limitations. Another object is the provision of apparatus which is reliable and inexpensive and yet will protect a load from being damaged due to miswiring of the phase sequence of a polyphase power supply.

Briefly, in accordance with the invention, first and second resistors having a first impedance and a capacitor having an equivalent impedance are connected in a Y configuration and an analog comparator network is coupled in line with the first resistor to monitor the voltage differential which occurs when the phases are in and out of sequence. According to a feature of the invention, the output of the comparator network is coupled to the base of a transistor which serves as a switch to provide a signal to suitable control circuitry. According to another feature of the invention, an opto-isolator is preferably used as an interface between the comparator network and the control circuitry for isolation and reference ground purposes. The control circuit can provide visual or audio indication of incorrect phase sequencing and preferably prevents energization of the load, e.g., compressor system, when the phases are out of sequence.

BRIEF DESCRIPTION OF THE DRAWINGS

FIG. 5 is a schematic circuit diagram of a portion of the FIG. 3 circuit modified to change the output logic so that the output switch is non-conductive when the phases are wired in sequence; and FIG. 5(a) is a schematic circuit diagram of a portion of the FIG. 4 circuit modified to interface with the FIG. 5 circuit.

DESCRIPTION OF THE PREFERRED EMBODIMENTS

Figure 1:
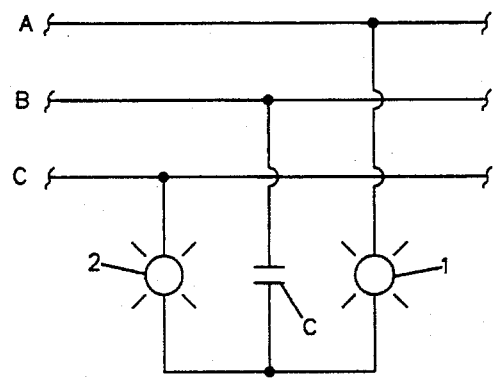
FIG. 1 is a schematic circuit diagram of a conventional phase sequence detection arrangement.

With reference to FIG. 1, it is known to use a pair of neon lamps, 1 and 2 and a capacitor C in which the resistance of each of the lamps and the reactance of the capacitor are approximately the same. The elements are connected in a Y configuration with lamp 1 connected to line A, capacitor C to line B and lamp 2 to line C. If the phase sequence is in fact as indicated in the figure, then lamp 2 will glow with the theoretical voltage drop across lamp 2 being approximately $1.37 \times V_{Line}$. The theoretical voltage drop across lamp 1 will be approximately $0.37 \times V_{Line}$, a level insufficient to illuminate the lamp. On the other hand, if lines A, B, C are miswired, i.e., A, C, B rather than A, B, C, the $1.37 \times V_{Line}$ voltage drop will be across lamp 1 which will glow indicating a miswired condition.

Figure 2:
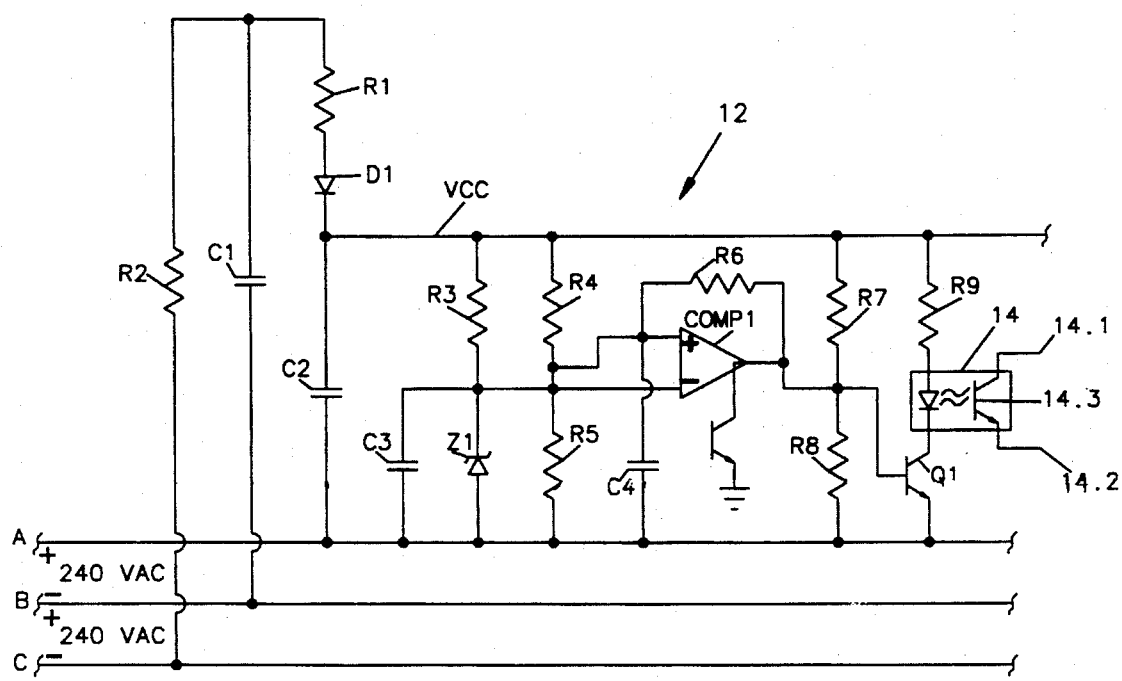
FIG. 2 is a schematic circuit diagram of a phase sequence protection circuit made in accordance with the invention.

In accordance with the invention as shown in FIG. 2, resistors R1 and R2 of the same resistance value are coupled in a Y configuration with capacitor C1 having an equivalent reactance. Resistor R1 is adapted to be connected to line A, capacitor C1 to line B and resistor R2 to line C. A comparator network 12 is placed in line with resistor R1 and comprises half wave rectifying diode D1 serially connected to filter capacitor C2, in turn connected to line A. The resistance value of resistors R1, R2 is chosen so that a supply voltage $V_{cc}$ of approximately 8 volts is obtained to power the protection circuit. A fixed reference voltage $V_{31}$ is provided by resistor R3 and zener diode Z1 coupled between $V_{cc}$ and line A which is connected to the inverting input of comparator COMP1. A filter capacitor C3 is connected on one side between resistor R3 and the cathode of zener diode Z1 and on the other side to line A and the anode of zener diode Z1. The non-inverting input of comparator COMP1 is connected to a voltage divider comprising resistors R4, R5 coupled between $V_{cc}$ and line A. The output of comparator COMP1 is coupled to the non-inverting input through feedback resistor R6 and to the base of an NPN transistor Q1 and the mid-point of voltage divider R7, R8 connected between $V_{cc}$ and line A. A filter capacitor C4 is also placed between the non-inverting input and line A. The collector of transistor Q1 is connected to the light emitting diode of opto-isolator 14 connected to $V_{cc}$ through resistor R9. Opto-isolator 14 has an output NPN transistor 14.3 with a collector 14.1 and emitter 14.2 which conducts when exposed to light from the light emitting diode. Collector 14.1 and emitter 14.2 interface with a switch control circuit such as that shown in FIG. 4 to be discussed below.

Under conditions in which the phases are properly wired as shown in FIG. 2, the voltage drop across resistor R1 will be approximately $0.37 \times V_{Line}$ and $V_{cc}$ will be approximately 8 volts. Voltage $V_+$ provided by the voltage divider R4, R5 will be less than voltage $V_{31}$, the reference voltage provided by zener diode Z1, therefore the NPN open collector output transistor of comparator COMP1 will be biased on so that current through resistor R7 will flow to reference analog ground preventing transistor Q1 from turning on and concomitantly opto-isolator 14 thereby indicating that the system is properly wired.

Under conditions in which the phase sequence is miswired, that is, lines A, B, C shown in the figure in fact are wired to conduct phases A, C, B, respectively the $V_{R1}$ voltage will be approximately $1.37 \times V_{Line}$ and $V_{cc}$ will be greater than 12 volts. Voltage $V_+$ provided by voltage divider R4, R5 will be greater than the reference voltage $V_{31}$ and therefore the NPN open collector of output transistor of comparator COMP1 will be biased off allowing current through resistor R7 to bias on transistor Q1 and concomitantly current to flow through the photo diode of opto-isolator 14 and thereby provide a signal on lines 14.1, 14.2 that the system is miswired.

Figure 3:
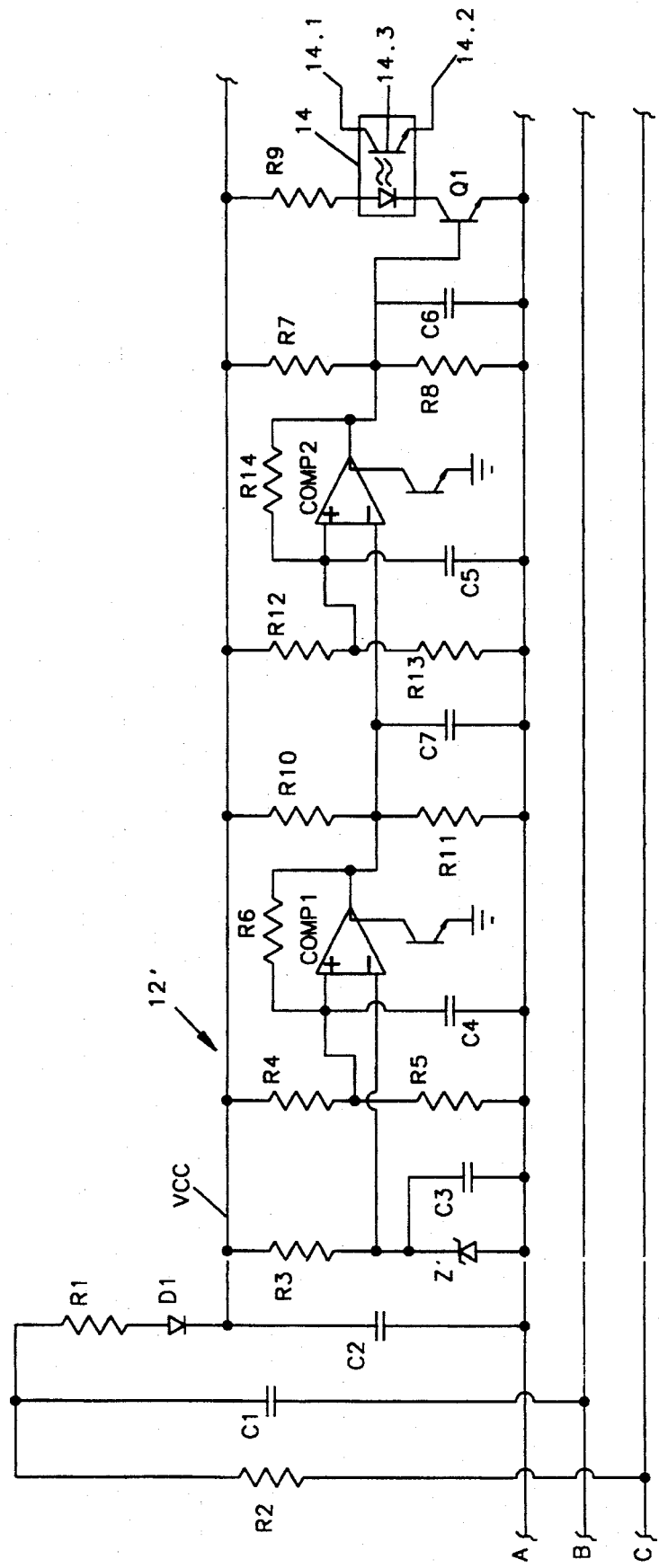
FIG. 3 is a schematic circuit diagram similar to FIG. 2 of a modified embodiment in which the output switch is conductive when the phases are wired in sequence.

In the FIG. 3 circuit 12', a buffer section, is added to provide switching hysteresis to prevent so called contact chatter. The buffer section also reverses the switching logic so that a signal is provided on lines 14.1, 14.2 when the phases are properly wired in sequence. The buffer section comprises comparator COMP2 having its non-inverting input coupled to a voltage divider comprising resistors R12, R13 and its inverting input coupled to the output of comparator COMP1 and the common point between serially connected resistors R10, R11 coupled between $V_{cc}$ and line A. Feedback resistor R14 coupled between the output of comparator COMP2 and its non-inverting input provides suitable switching hysteresis and a capacitor C5 is connected between the non-inverting input and line A, and capacitor C6 is connected between the base of transistor Q1 and line A.

A protection circuit built in accordance with FIG. 3 adapted for use with 240 VAC comprised the following components.

| Resistor R1 | 25K ohms | Capacitor C1 | 0.1 uf 250 VAC |
|---|---|---|---|
| Resistor R2 | 25K ohms | Capacitor C2 | 4.7 uf |
| Resistor R3 | 10K ohm | Capacitor C3 | 0.1 uf |
| Resistor R4 | 40K ohms | Capacitor C4 | 0.1 uf |

-continued

| Resistor R5 | 75K ohms | Capacitor C5 | 0.1 uf |
|---|---|---|---|
| Resistor R6 | 130K ohms | Capacitor C6 | 0.1 uf |
| Resistor R7 | 35K ohms | Capacitor C7 | 0.1 uf |
| Resistor R8 | 20K ohms | Opto-isolator 14 | MOC 8112 |
| Resistor R9 | 4.1K ohms | Zener Diode Z1 | 5.1v |
| Resistor R10 | 40K ohms | Diode D1 | 1N4007 |
| Resistor R11 | 130K ohms | Comparator COMP1 | LM2901 |
| Resistor R12 | 40K ohms | Comparator COMP2 | LM2901 |
| Resistor R13 | 75K ohms | Transistor Q1 | 2N3904 |
| Resistor R14 | 130K ohms | | |

When the phase sequence is properly wired the reference voltage at the inverting input of comparator COMP1 is greater than the non-inverting input thereby biasing the NPN open collector transistor of the comparator on which results in pulling the inverting input of comparator COMP2 to the established analog ground therefore turns the NPN open collector transistor of comparator COMP2 off. This permits current flow through resistor R7 to turn on transistor Q1 and excite opto-isolator 14 to provide current flow through leads 14.1, 14.2.

In the event that the phase sequence is miswired, the rail voltage $V_{cc}$ will increase so that the voltage at the non-inverting input of comparator COMP1 will exceed the reference voltage which will then result in turning off the output transistor of comparator COMP1 and biasing on the output transistor of comparator COMP2 which in turn will prevent turning on of transistor Q1 and excitation of opto-isolator 14.

Figure 4:
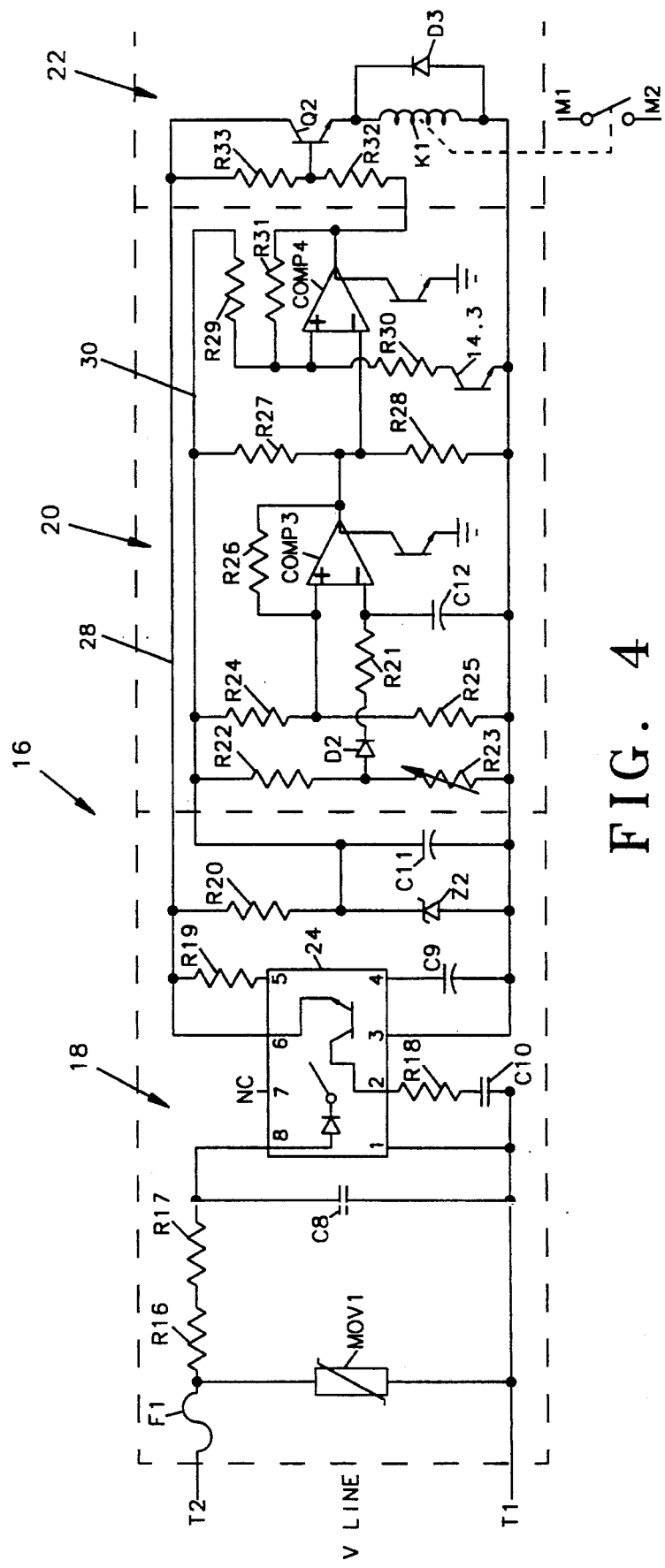
FIG. 4 is a schematic circuit diagram of an electronic motor protection circuit with which the protection circuit of the invention can be used.

The FIG. 3 protection circuit can be used, for example, with an electronic motor protection circuit such as that set forth in copending application Ser. No. 07/943,254 assigned to the assignee of the present invention. A simplified version of that circuit is shown in FIG. 4. The electronic motor protection circuit 16 shown in FIG. 4 comprises a power supply section 18, over temperature protection section 20 and output circuit section 22. Power supply section 18 comprises a fuse F1 connected to the AC high, terminal T2 as a safety feature so that in the event of a short circuit the apparatus will fail with an open circuit. A surge suppressor varistor MOV1 is coupled across the AC high terminal T2 and AC return terminal T1 to clamp high frequency and high energy transients such as lightning surges. Resistors R16, R17 and capacitor C8 connected across the AC lines serve as a low pass filter to filter high frequency noise and line spikes. Additionally, resistors R16, R17 serve as current limiting devices for the SCR based pre-regulator to be discussed below.

Circuit 16 includes a single chip power supply, integrated circuit 24, an eight pin device having a first switching pre-regulator section and a second voltage regulator section. Pin 8, connected to the pre-regulator section, is connected to the AC high line through resistors R16, R17. Pin 1 is connected to the AC return line and through an inhibit capacitor C9 to pin 4 to provide protection from transients that exceed the dv/dt rating of IC24 by going from a high impedance to a low impedance thereby preventing an internal SCR in IC24 from gating on.

An energy storage capacitor C10 is connected to pin 2, through charging resistor R18. Pin 2 is coupled internally in chip 24 to the output of the switching pre-regulator section and the input of the voltage regulator section. The output of the voltage regulator section is connected to pin 6 with a feedback resistor R19 connected between pins 6 and 5. Pin 3 is connected to the analog ground of the control and output circuit. The output of the regulator section provides a 24 volt DC supply on line 28 for relay coil K1 for controlling associated contacts M1, M2.

A lower voltage, i.e., 12 volts, suitable for operation of the control circuit is provided by suitable means such as a dropping resistor R20 serially connected to a 12 volt zener diode Z2 connected between the output of IC24 and analog ground. Power supply section 18 also includes a storage capacitor C11 connected between the low voltage output at the junction of resistor R20, diode Z2 and analog ground.

Over temperature protection section 20 comprises a comparator COMP3 having its inverting input connected, through diode D2, resistor R21 and capacitor C12 to the junction of a reference resistor R22 and a PTC resistor R23 which are connected between control circuit supply voltage 30 and analog ground. The non-inverting input of comparator COMP3 is connected to the junction of voltage divider resistors R24, R25 connected between line 30 and analog ground to establish a reference voltage. Feedback resistor R26 is connected between the output of comparator COMP3 and the non-inverting input. The RC network of resistor R21 and capacitor C12 snubs down noise transients on the sensor input thereby preventing nuisance tripping.

The output of comparator COMP3 is connected to the junction of a voltage divider in a buffer circuit portion comprising resistors R27, R28 and the junction of which in turn is connected to the inverting input of a comparator COMP4. The non-inverting input is connected to the junction of a voltage divider comprising resistors, R29, R30. Feedback resistor R31, providing hysteresis which in turn provides a clear demarcation for switching comparator COMP4 and avoids relay or contactor contact chatter, is connected between the output of comparator COMP4 and the non-inverting input. The output of comparator COMP4 is connected to the output voltage line 28 of IC24 through resistors R32, R33 in output circuit 22. The emitter, collector terminals of PNP transistor Q2 are serially connected between supply line 28 and relay coil K1 which in turn is connected to analog ground. The base of transistor Q2 is connected to the junction of resistors R32, R33. Diode D3 is coupled across relay coil K1 to prevent back EMF thereby protecting transistor Q2.

As stated above, a voltage reference provided by voltage divider R24, R25 establishes a threshold level at the non-inverting input of comparator COMP3. The variable voltage provided by the PTC sensor, resistor R23, comprises the variable voltage at the inverting input of comparator COMP3 which varies according to the change in resistance of the PTC resistor dependent on changes in temperature of the PTC resistor. When the voltage at the inverting terminal exceeds that of the non-inverting terminal the output NPN transistor of comparator COMP3 is biased on thereby sinking current to analog ground. This results in the reference voltage at the non-inverting input of comparator COMP4 being greater than the voltage at the inverting input of comparator COMP4 resulting in the output transistor of comparator COMP4 being biased off preventing current flow to analog ground for transistor Q2 and concomitantly de-energizing the relay coil K1 opening contacts M1, M2 and, in turn, the motor. Feedback resistor R26 provides hysteresis to prevent transistor Q2 from being biased on until the PTC resistor has cooled to its normal operating resistance level at which time the circuit will reset and permit energization of coil K1, contacts M1, M2 and the motor.

The FIG. 3 phase sequence protection circuit can be used with the electronic motor protection circuit 16 of FIG. 4 by connecting the output transistor 14.3 of opto-isolator 14 to the non-inverting input of comparator COMP4 through resistor R30 as shown in FIG. 4. When the phases have been wired correctly in sequence, transistor 14.3 conducts without affecting the voltage levels of the comparator inputs; however, if the phases are wired out of sequence the output transistor will be turned off thereby increasing the voltage level at the non-inverting input to essentially the rail voltage turning the NPN open collector transistor of comparator COMP4 off along with transistor Q1 and thereby de-energizing coil K1.

FIGS. 5 and 5(a) show a modified embodiment in which phase sequence protection circuit 12" is "off" when the phase sequence is properly wired. As shown in FIG. 5 the inverting input of comparator COMP1 is connected to the junction of voltage divider R4', R5' while the non-inverting input is connected to the fixed reference voltage provided by zener diode Z1 and resistor R3. The output of comparator COMP1 is connected to the non-inverting input through feedback resistor R6' and to the junction of voltage divider R10, R11 and to the inverting input of comparator COMP2. The non-inverting input of comparator COMP2 is connected to the junction of voltage divider R12, R13 and feedback resistor R14' is connected between the output of comparator COMP2 and its non-inverting input.

When the phases are wired in sequence comparator COMP1 will be off because its non-inverting input will be greater than the reference voltage at the inverting input. With comparator COMP1 off the voltage at the inverting input of comparator COMP2 will be higher than the non-inverting input so that the NPN output transistor of comparator COMP2 will be on thereby sinking current through resistor R7 to analog ground and turning off transistor Q1 and concomitantly transistor 14.3. In this embodiment transistor 14.3 is connected through current limiting resistor RL to the inverting input of comparator COMP4 so that with transistor 14.3 de-energized the voltage at the inverting input of comparator COMP4 is determined by the voltage divider R27, R28.

In the event of miswiring the voltage at rail $V_{cc}$ increases concomitantly increasing the voltage at the inverting input of comparator COMP1 above the non-inverting, reference voltage to turn the NPN output transistor of the comparator on and thereby lowering voltage at the inverting input of comparator COMP2 below that of the non-inverting input and turning off the NPN output transistor of comparator COMP2. With the NPN output transistor of comparator COMP2 off transistor Q1 is turned on along with transistor 14.3 which then lowers the voltage at the inverting input of comparator COMP4 turning the NPN output transistor of comparator COMP4 off, de-energizing transistor Q2 and coil K1. The embodiment of FIGS. 5, 5(a) provides an advantage of enhanced efficiency since transistor Q1 of the protection circuit 12" is normally not energized.

Although the protection system made in accordance with the invention utilizes an analog comparator network it will be realized that a digital system could be used as well. Further, although it is preferred to use two resistors and a capacitor as the Y connected impedance elements due to cost considerations it is also possible to use other impedance elements, such as an inductor rather than a capacitor. The protection system can be used with different line voltage levels merely by choosing appropriate values for the impedance elements, R1, R2 and C1. It will also be realized that the invention can be utilized with polyphase power supplies having more than three phases. The system made in accordance with the invention is easily manufactured using a high percentage of automatically insertable components, is of low cost yet has solid state reliability and easily interfaces with standard electronic control systems.

Although the invention has been described with regard to specific preferred embodiments thereof, many variations and modifications will become apparent to those skilled in the art. It is therefore the intention that the appended claims be interpreted as broadly as possibly in view of the prior art to include all such variations and modifications.

What is claimed:

1. Phase sequence protection circuit apparatus for interfacing a three phase AC power source on respective three AC power source leads with a load comprising first and second resistors each having a first value of impedance and a first capacitor having an impedance equivalent to the first value, the first and second resistors and the first capacitor being coupled together in a Y configuration, the resistors and capacitor being coupled to respective power source leads, a comparator network coupled to only one of the AC power source leads comprising a diode to rectify AC current conducted through the first resistor to provide a voltage source rail for the protection circuit, the DC magnitude of the voltage source rail being dependent upon the sequence of connection of the power source leads with a load, a comparator having an inverting and a non-inverting input and a transistor output, zener diode means coupled to the rail to provide a fixed reference voltage, the reference voltage coupled to the inverting input, a voltage divider comprising third and fourth resistors connected between the rail and the respective line, a junction formed between the third and fourth resistors, the junction coupled to the non-inverting input, a solid state switch, the output of the comparator coupled to the solid state switch, the voltage at the inverting input being greater than the voltage at the non-inverting input when the first and second resistors and the first capacitor are coupled to the three AC power source leads with the phases in sequence thereby biasing the transistor output into conduction and the voltage at the inverting input being less than the voltage at the non-inverting input when the first and second resistors and the first capacitor are coupled to the three AC power source leads with the phases out of sequence thereby turning the transistor output off, the solid state switch turning on in one of the two states of the transistor output and turning off in the other of the two states of the transistor output to thereby provide a signal in dependence upon whether the phases are in sequence.

2. Phase sequence protection circuit apparatus according to claim 1 further comprising an output circuit having a relay coil and a second solid state switch in series with the relay coil and means to couple the signal to the second solid state switch in the output circuit to de-energize the second solid state switch and concomitantly the relay coil when the phases are out of sequence and in turn de-energize a motor through a contactor controlled by energization of the relay coil.

3. Phase sequence protection circuit apparatus according to claim 2 further including opto-isolation means disposed between the comparator network and the output circuit comprising the relay coil and the second solid state switch.

4. Phase sequence protection circuit apparatus for interfacing a three phase AC power source on respective three AC power source leads with a load comprising first and second resistors each having a first value of impedance and a first capacitance having an impedance equivalent to the first value, the first and second resistors and the first capacitor being coupled together in a Y configuration, the resistors and capacitor being coupled to respective power source leads, the voltage drop across the first resistor having a first value when the first and second resistors and the first capacitor are coupled to the three AC power source leads with the phases in sequence and the voltage drop across the first resistor having a second, different value when the first and second resistors and the first capacitor are coupled to the three AC power source leads with the phases out of sequence, and phase sequence responsive means coupled to only one of the power source leads comprising a solid state switch coupled to the first resistor and being turned on when the voltage drop across the first resistor is one of the first and second values and being turned off when the voltage drop across the first resistor is the other of the first and second values.

5. Phase sequence protection circuit apparatus for interfacing a three phase AC power source on respective power source leads with a load comprising first, second and third impedance elements each having an equivalent impedance value and being coupled together in a Y configuration, the elements being coupled to respective power source leads, the voltage drop across the first element being approximately $0.37 \times V_{Line}$ when the elements are coupled to the three AC power source leads with the phases in sequence and the voltage drop across the first element being approximately $1.37 \times V_{Line}$ when the elements are coupled to the three AC power source leads with the phases out of sequence, and phase sequence responsive means coupled to only one of the power source leads comprising a solid state switch coupled to the first element and being turned on when the voltage drop across the first element is one of approximately $0.37 \times V_{Line}$ and $1.37 \times V_{Line}$ and being turned off when the voltage drop across the first element is the other of approximately $0.37 \times V_{Line}$ and $1.37 \times V_{Line}$.

6. Phase sequence protection apparatus according to claim 5 in which the first and second elements are resistors and the third element is a capacitor.

* * * * *